(12) United States Patent
Schneider et al.

(10) Patent No.: US 7,164,758 B1
(45) Date of Patent: Jan. 16, 2007

(54) SYSTEM, EVALUATION DEVICE AND METHOD FOR VERIFYING CONNECTION-RELATED COMMUNICATION DATA DETERMINED BY A DIGITAL EXCHANGE

(75) Inventors: Ernst Schneider, Langenzenn (DE); Monika Schmidt, Nuremberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/937,053

(22) PCT Filed: Mar. 2, 2000

(86) PCT No.: PCT/EP00/01809

§ 371 (c)(1), (2), (4) Date: Dec. 21, 2001

(87) PCT Pub. No.: WO00/57618

PCT Pub. Date: Sep. 28, 2000

(30) Foreign Application Priority Data

Mar. 19, 1999 (DE) .................................. 199 12 414

(51) Int. Cl.
*H04M 15/00* (2006.01)
*H04M 3/22* (2006.01)

(52) U.S. Cl. ................. 379/126; 379/10.01; 379/10.03; 379/13; 379/112.01

(58) Field of Classification Search .................... 379/9, 379/10.01, 10.03, 13, 28, 112.01, 121.01, 379/126
See application file for complete search history.

(56) References Cited

U.S. PATENT DOCUMENTS

| | | | |
|---|---|---|---|
| 5,369,680 A | * | 11/1994 | Borbas et al. ........... 379/10.02 |
| 5,483,590 A | | 1/1996 | Chiu et al. |
| 5,539,802 A | * | 7/1996 | De Caluwe et al. .......... 379/13 |
| 5,579,476 A | * | 11/1996 | Cheng et al. ................. 714/32 |
| 5,729,588 A | * | 3/1998 | Chin et al. ..................... 379/14 |
| 5,740,355 A | * | 4/1998 | Watanabe et al. ............. 714/45 |
| 5,835,566 A | * | 11/1998 | Cowgill ................... 379/15.01 |
| 5,940,472 A | * | 8/1999 | Newman et al. ......... 379/10.02 |
| 5,987,633 A | * | 11/1999 | Newman et al. ............ 714/712 |
| 6,385,444 B1 | * | 5/2002 | Peschel et al. .............. 455/405 |
| 6,526,124 B1 | * | 2/2003 | Swahn et al. ............ 379/29.01 |
| 6,891,938 B1 | * | 5/2005 | Scott et al. ............ 379/112.06 |

FOREIGN PATENT DOCUMENTS

| | | |
|---|---|---|
| DE | 36 42 849 A1 | 6/1988 |
| DE | 44 26 739 C2 | 1/1998 |
| DE | 196 16 827 C1 | 1/1998 |

* cited by examiner

*Primary Examiner*—Barry Taylor
(74) *Attorney, Agent, or Firm*—Kenyon & Kenyon LLP

(57) ABSTRACT

A system and method for ensuring that a digital switching exchange is able to properly collect data on the charges incurred for pay connections by providing a verification of the accuracy of the communications data records generated by the digital switching exchange. A system and method containing at least one test unit that is able to be linked to the digital switching exchange. The test unit includes a device for generating a connection-related reference data record. The digital switching exchange is able to generate at least one connection-related communications data record from transmitted communications elements. The contents of the connection-related reference data record are compared in a system evaluator to the contents of each connection-related communications data record belonging to it.

15 Claims, 2 Drawing Sheets

| Beginning Instant | Destination Address | Source Address | Service Type | Service Feature | Date | Ending Instant | Test Case Number |
|---|---|---|---|---|---|---|---|

FIG. 2

SYSTEM, EVALUATION DEVICE AND METHOD FOR VERIFYING CONNECTION-RELATED COMMUNICATION DATA DETERMINED BY A DIGITAL EXCHANGE

FIELD OF THE INVENTION

The present invention is directed to a system and a method for validating connection-related communications data collected by a digital switching exchange, as well as to a system evaluator to be employed by such a system or method.

BACKGROUND INFORMATION

A feature of digital switching exchanges in a telecommunications network is collecting data on the charges incurred when a service is used. To this end, all communications data required for calculating the charges must be acquired for each communications connection in the digital switching exchange. Appropriate test systems are needed to verify the accuracy of the communications data acquisition. However, existing test systems are merely able to verify that communications data, combined into communications data records, have the correct format. Therefore, the available test systems are only able to ascertain whether the structure of the communications data records conforms to a defined structure, and whether the communications data contained in data fields of a communications data record reside within the range of values assigned to the corresponding data field.

Reference U.S. Pat. No. 5,729,588 purportedly concerns a recording verification system which can be used to determine the correctness of message accounting data (AMA data), which are generated by a device to be tested for an established test connection.

SUMMARY OF THE INVENTION

Embodiments of the present invention provide a system, a system evaluator, and a method, which may make it possible to verify the accuracy of communications data records generated by a digital switching exchange with greater precision.

Embodiments of the present invention not only validate the communications data records generated by a digital switching exchange for at least one communications connection, with respect to their structure, but also validate with respect to the contents of the communications data contained in the communications data records.

In embodiments of the present invention, to be able to verify not only the structure, but also the contents of communications data records for accuracy, the testing system includes at least one test unit, which can be linked to the digital switching exchange and which contains a first memory unit for storing dedicated communications elements, a device for initiating the establishment of at least one dedicated test-communications connection, a device for producing a connection-related reference data record from the corresponding communications elements, the starting and ending time of the communications connection, as well as a device for transmitting the connection-related communications elements to the digital switching exchange. In addition, the system includes at least one digital switching exchange, which functions in response to the received, connection-related communications elements to establish the relevant test communications connection. Also implemented in the digital switching exchange is a device for producing at least one connection-related communications data record. Moreover, the system has a system evaluator, which is assigned to the test unit and the digital switching exchange and which includes a device for comparing the contents of the connection-related reference data record to the contents of each connection-related communication data record belonging thereto. The system evaluator is provided with a device for recognizing communications data records assigned to a test communications connection, particularly when, for security reasons, new communications data records are ascertained at regular time intervals for an existing communications connection. It is recognized that a plurality of communications data records belong together in one connection when the same connection-identifying data contents, e.g., the destination and/or source address, are contained in each communications data record. For such a case, the comparator may be designed to compare the connection-related reference data record to each of the merged, connection-related communications data records.

In embodiments of the present invention, the system evaluator also recognizes that an individual communications data record of the merged communications data records belongs to the corresponding reference data record when the beginning and ending time stamps of the individual communications data record lie within the time interval defined by the beginning and ending time stamps of the reference data record.

In embodiments of the present invention, the beginning time stamp of the combined communications data records results in a time sequence being defined on the communications data records. The system evaluator recognizes that the sequence of the communications data records, which belong together, is correct when, in the case of the communications data record that immediately follows in time, the beginning time stamp corresponds to the ending time stamp of the immediately preceding communications data record, and when the time span, defined by the beginning time stamp of the first communications data record and the ending time stamp of the last communications data record, corresponds to the total duration of the test communications connection defined by the beginning time stamp and the ending time stamp of the reference data record.

Since the test unit and the digital switching exchange usually employ different data record formats, in embodiments of the present invention, the system evaluator may also include a first device for converting the format of the reference data record and a second device for converting the format of each communications data record into a uniform format. This measure may eliminate the need to only use test units in the test system which work with the format of the digital switching exchange.

Mention is made at this point that, in the claims and throughout the Specification, the term "communications data" includes the communications elements, as well as the beginning and ending instants of the corresponding test communications connection. By the term "communications element", one may understand, in turn, parameters such as destination address and source address of the test unit, date of the communications connection, service type, service feature, and the like. Services may include, e.g., telephony, ISDN or ANIS subscribers, data communications and the like. Service features include, for example, three-party conferences, brokering or alternating between two lines, and the like.

In embodiments of the present invention, in a generally available way, a communications data record and a reference data record include a plurality of dedicated data fields. Each data field of a communications and reference data record includes stored communications data. Moreover, each data field is assigned a range of values, within which the communications data contained in the data field must lie. Thus, for example, the range of values for the data field "date of the communications connection" is defined by the Gregorian calendar, while the range of values of the data field "beginning instant of the connection" is defined by the time frame from 0 to 24 hours. The range of values for the "service type" data field is defined by a given set of services, while the range of values of the "service feature" data field is defined by all authorized service features.

In embodiments of the present invention, to be able to verify the accuracy of a communications data record with respect to its structure as well, the system evaluator includes a device for checking the structure of the communications data record, as well as a device for checking the data fields to determine whether the communications data contained in a data field lie within the particular range of values.

In addition, in embodiments of the present invention, the system evaluator has a device which is able to verify whether each communications data record produced in the digital switching exchange belongs to an established test communications connection. Consequently, it can be ascertained, on the one hand, whether the digital switching exchange has produced valid communications data records for every established test communications connection by comparing the generated communications data records to the reference data record belonging to the test communications connection. On the other hand, the system evaluator recognizes whether a test communications connection has been established at all for the generated communications data records.

Although, prior to each test, the test system is time-synchronized, i.e., the test unit and the digital switching exchange are synchronized, time deviations are inevitable in the data fields for the beginning and ending times of the corresponding test communications connection. The reason for this time deviation is, for example, that, depending on the particular manufacturer, the digital switching exchanges handle the decimal places for the seconds information differently. Thus, some digital switching exchanges employ rounding rules, while others cut off the decimal places without rounding off. For that reason, when verifying the "beginning time stamp" and "ending time stamp" data fields of the test communications connection, the system evaluator must allow for a predetermined tolerance range with respect to time. For example, one possible tolerance range is one second. This tolerance range is stored in the system evaluator and can be accessed by the comparator for every evaluation.

Both the test unit as well as the digital switching exchange have a buffer memory in which the generated reference data record and, as the case may be, the connection-related communications data records can be stored.

Embodiments of the present invention also provide for a system evaluator, which can be connected via at least one interface to the digital switching exchange and, via at least one further interface, to the test unit. Another device is used for recognizing interrelated communications data records which are assigned to a test communications connection. To also be able to compare the contents of a connection-related reference data record produced by the test unit to the contents of each communications data record of interrelated communications data records produced by the digital switching exchange with regard to a test communications connection, provision is made for a comparator that is designed for this purpose.

In embodiments of the present invention, if the reference data record and the communications data records have different formats, appropriate converters provide for a conversion into a uniform format that can be processed by the comparator.

Embodiments of the present invention provide for a method for validating the connection-related communications data acquired by a digital switching exchange.

In embodiments of the present invention, before each test is begun, a plurality of communications elements is stored in at least one test unit that can be linked to a digital switching exchange. Depending on the test that is selected, the test unit initiates the establishment of at least one dedicated test communications connection. In addition, the connection-related communications elements, which are required depending on which test is selected, are transmitted to the digital switching exchange. Functioning in response to the received, connection-related communications elements, the digital switching exchange establishes the relevant test communications connection. It is noted at this point that a deployed test unit can simulate both a calling as well as a called device, so that a test communications connection is incoming and outgoing at one and the same test unit. Of course, it is also conceivable to establish a test communications connection between two separate test units. In the next step, the test unit generates a reference data record from the connection-related communications elements, which are defined by the selected test, and from the beginning and ending instants of the corresponding test communications connection. The digital switching exchange also generates at least one communications data record from the received communications elements and the ascertained beginning and ending instants of the test communications connection. Following the connection cleardown (or connection release), both the reference data record as well as each communications data record of the corresponding test communications connection are transmitted to a system evaluator. The contents of the connection-related reference data record are subsequently compared in the system evaluator to the contents of each communications data record belonging to it.

In the case that the format of the reference data record and the format of the communications data record do not match, the different formats are converted in the system evaluator into a uniform format before the comparison step is implemented.

In embodiments of the present invention, a communications data record is indicated as being faulty when its contents cannot be assigned to the contents of the corresponding reference data record, when its structure does not correspond to a predetermined structure, or when the communications data contained in a data field are not within the range of values assigned to the data field.

BRIEF DESCRIPTION OF THE DRAWINGS

FIG. 2 shows an example of a format of a communications and/or reference data record.

DETAILED DESCRIPTION OF THE DRAWINGS

Figure 1:
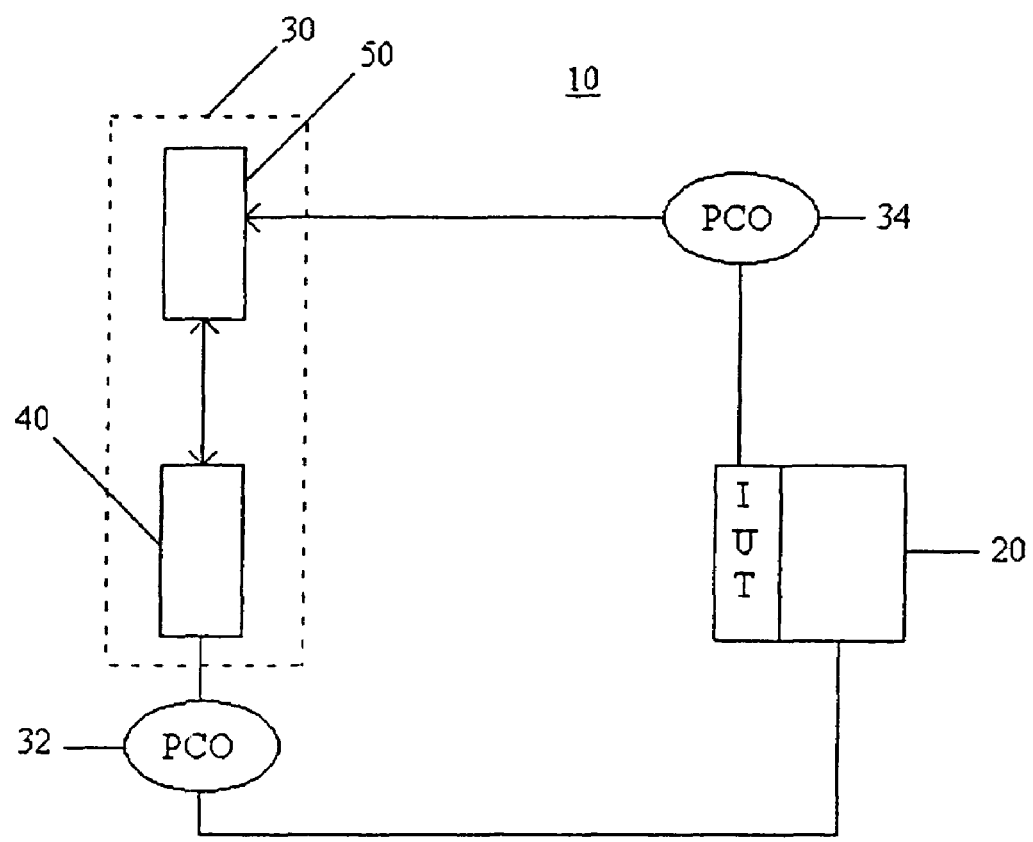
FIG. 1 shows the schematic set-up of the test system according to the present invention.

FIG. 1 depicts the schematic set-up of test system 10 according to the present invention. Test system 10 includes at least one digital switching exchange 20, as well as a test configuration 30, which has at least one test unit 40 and one system evaluator 50, which is able to be linked both to digital switching exchange 20 as well as to test unit 40. Test unit 40 is linked via a subscriber-side telecommunications terminal to the assigned digital switching exchange 20. In accordance with the ISO 9646 standard, test configuration 30 communicates via two so-called points of control and observation 32, 34 (PCO) with the implementation under test (IUT), which is embedded in digital switching exchange 20 to be tested. In addition, test unit 40 is designed such that, as a function of a selected test case, the corresponding communications elements—also referred to as abstract service primitives (ASP)—, can be transmitted via point of control and observation 32 and the subscriber-side telecommunications terminal to the digital switching exchange 20. The communications elements, which had been previously stored in test unit 40 depending on the test case selected, include, for example, the destination address, the source address, the date of the test communications connection, service types and service features. Via a standardized hardware interface of digital switching exchange 20 to be tested, the communications data records generated by digital switching exchange 20 are then transferred via the second point of control and observation 34 to system evaluator 50.

A scenario is used in the following to explain the method of functioning and operation of test system 10.

The function and purpose of test system 10 of the present invention is to validate communications data records generated in digital switching exchange 20, which are used to calculate the charges for a pay communications connection. Only when the communications data records are correctly generated can an error-free calculation of charges be made.

First, a specific test case is selected, which can include a single test step or a plurality of parallel or sequential test steps. For the test case at hand, we will assume that a customary telephone connection between two ISDN terminals is to be established. Therefore, the service "telephone connection between ISDN units" is used as a service type. In addition, we will assume that test unit 40 is able to simulate both the calling ISDN subscriber as well as the called ISDN subscriber. The test case selected also determines the destination and source address of the two subscribers. The date and beginning instant are derived from the instant that the test communications connection is established. All these communications elements belonging to the selected test case are stored in a memory of test unit 40.

Prior to the start of the test, it must be ensured that all terminals of digital switching exchange 20 not belonging to the test configuration be inactive, and that they not be able to be activated during execution of the test. This condition is necessary in order to check whether the communications data records generated during the course of the test can be assigned to a specific reference data record.

At the beginning of the test procedure, communications elements pertaining to the test are transferred by testing device 40 from the memory via PCO 32 and the telecommunications terminal to the IUT of digital switching exchange 20. Depending on the communications element received, digital switching exchange 20 establishes the selected test communications connection to the subscriber having the relevant destination address. The beginning time stamp of the established test communications connection is subsequently recorded both in test unit 40 as well as in digital switching exchange 20. Once the test communications connection is cleared down, the ending time stamp of the communications connection is likewise determined in test unit 40 and in digital switching exchange 20 and stored in each case in a memory. Once the test communications connection is ended, test unit 40 generates a reference data record from the communications elements pertaining to the test, as well as from the beginning and ending instants of the test communications connection. A representative format of the reference data record is shown in FIG. 2. The reference data record is composed, for example, of the data fields "beginning instant", "destination address", "source address", "service type", "service feature", "data", "ending instant", and "test case number". This reference data record is stored in a memory of test unit 40. From the received communications elements and the beginning and ending instants of the test communications connection, digital switching exchange 20 also produces a corresponding, connection-related communications data record, whose structure can conform to the format shown in FIG. 2. The generated communications data record is stored, in turn, in a buffer.

In system evaluator 50, a predetermined range of values is assigned, as a function of the test selected, to each data field of the reference or communications data record. The range of values of the data fields "beginning instant" and "ending instant" is defined by the clock time from 0 to 24 hours. The range of values of the data fields "destination address" and "source address" includes a plurality of permissible addresses. The range of values of the data fields "service type" and "service feature" is defined by the various preselected services and service features. The range of values of the "date" data field is defined, for example, by the Gregorian calendar.

To facilitate an error-free comparison of the data fields "beginning instant" and "ending instant" of the test communications connection in the comparison step to be described in greater detail in the following, the comparator of system evaluator 50 must allow for a tolerance range with respect to time in system evaluator 50, since system-induced inaccuracies can occur between the internal clock of test unit 40 and that of the digital switching exchange 20. For that reason, deviations of, for example, one second are permitted in a comparison of the "beginning instant" or "ending instant" data fields.

At this point, the reference data record and the communications data record are transferred to system evaluator 50 and stored there in a buffer memory. Test unit 40 transfers the reference data record to system evaluator 50, by way of Ethernet and file transfer, for example, while the communications data record can be transferred by the digital switching exchange via an X.25 connection to system evaluator 50.

The reference data record and communications data record present in the buffer memory of system evaluator 50 differ, for example, in their data structure and coding. For this reason, system evaluator 50 is provided with converters which are able to convert the format of the reference data record and that of the communications data record into a uniform format.

System evaluator 50 initially checks to determine whether the structure of the communications data record generated by digital switching exchange 20 conforms to a predefined structure. It is subsequently checked to determine whether the communications data of the data fields of the communications data record shown in FIG. 2 are within the range of values assigned to each data field. If, in so doing, it is ascertained that the structure of the communications data record or the range of values of one or more data fields is exceeded or is fallen short of, then the communications data record is identified as a faulty record, and signaled, for example, to system evaluator 50. However, if the formal structure of the communications data record is error-free, then, in a further step, the contents of each data field of the reference data record are compared to the contents of the corresponding data field of the communications data record. When the data fields "beginning instant" and "ending instant" of the reference data record are compared to the corresponding data fields of the communications data record, a time deviation of, for example, one second is permissible, without an error being signaled. This time tolerance accommodates differences in the calculations of time data in test unit 40 and in digital switching exchange 20. Provided that the contents of all data fields of the reference data record and of the communications data record conform, it is ensured that digital switching exchange 20 is able to properly collect data on the charges incurred.

Reference is made to the fact that, with the assistance of test unit 40, a plurality of test communications connections can be established simultaneously via digital switching exchange 20. It is also conceivable that a plurality of test communications connections can be established among the various test units, via digital switching exchange 20. The system evaluator is designed for this purpose such that the reference and communications data records of various test communications connections can be analyzed in parallel and checked for accuracy.

For the sake of security, it can be expedient, during an existing communications connection, to generate a plurality of communications data records, referred to in the following as communications data sub-records, in which the ending time stamp of a preceding communications data sub-record corresponds to the beginning time stamp of the directly following communications data sub-record, so that each communications data sub-record describes in each case a predefined time span of the total duration of the communications connection. In other words, there can be a plurality of interrelated and connection-related communications data records for one connection-related reference data record. System evaluator 50 is able to verify that communications data sub-records pertaining to the test communications connection belong together by checking whether all communications data records contain the same connection-identifying data contents. Moreover, system evaluator 50 can compare the communications data records that belong together, on an individual basis, to the assigned reference data record. In a comparison to the corresponding reference data record, a communications data sub-record is identified as correct when the form and contents of all data fields, with the exception of the "beginning instant" and "ending instant" data fields, conform, and when, allowing for the predefined tolerance, the time span defined by the beginning time stamp and ending time stamp of a communications data sub-record is a subset of the total duration of the test communications connection set by the beginning time stamp and the ending time stamp of the reference data record. The beginning time stamp of the combined communications data records results in a time sequence being defined on the communications data records. System evaluator 50 recognizes the sequence of communications data records that belong together as being correct when, in the case of the particular communications data record that immediately follows in time, the beginning time stamp corresponds to the ending time stamp of the immediately preceding communications data record, taking into consideration the predefined tolerance, and when the time span defined by the beginning time stamp of the first communications data record and the ending time stamp of the last communications data record, taking into consideration the predefined tolerance, correspond to the total duration of the test communications connection set by the beginning time stamp and the ending time stamp of the reference data record. Upon completion of the comparison of the reference data record to the communications data records, a list of recognized errors can be output, for example.

What is claimed is:

1. A system for validating connection-related communications data collected by a digital switching exchange, comprising the following features:

at least one test unit linkable to the digital switching exchange and including a first memory unit for storing dedicated communications elements, a device for initiating the establishment of at least one dedicated test-communications connection, a device for producing a connection-related reference data record from corresponding communications elements, and a starting and an ending time of the communications connection, a device for transmitting the connection-related communications elements to the digital switching exchange;

the digital switching exchange which functions in response to the received connection-related communications elements to establish the relevant test communications connection;

a system evaluator assigned to the at least one test unit and to the digital switching exchange, including a device for comparing contents of the connection-related reference data record to contents of each respective connection-related communications data record belonging thereto, wherein the digital switching exchange has a device for generating a plurality of communications data records for the respective test communications connection, and the system evaluator has a device for recognizing communications data records which are assigned to any test communications connection, and a comparator compares each of the communications data records that correspond to the respective reference data record.

2. The test system as recited in claim 1, wherein the system evaluator further includes a first device for converting a format of the reference data record into a predefined data record format and a second device for converting a format of each communications data record into the predefined record format.

3. The test system as recited in claim 1, wherein each communications data record includes a plurality of predefined data fields which are each assigned a predefined range of values; and the system evaluator is designed to verify a structure of each communications data record and to verify each data field to determine whether the respective communications data contained in the corresponding data field is within a range of values in question.

4. The test system as recited in claim 1, wherein the system evaluator has a device for verifying at least one of:
a) whether each communications data record generated in the digital switching exchange belongs to an established test communications connection; and
b) whether at least one communications data record has been generated for an established test communications connection.

5. The test system as recited in claim 1, wherein in comparing one of contents of a predefined data field and contents of a plurality of predefined data fields of the reference data record to one of contents of a data field and contents of a plurality of data fields of each corresponding communications data record, the comparator of the system evaluator allowing for a preset tolerance range.

6. The test system as recited in claim 1, wherein each test unit includes a buffer device for temporarily storing a generated reference data record, and the digital switching exchange includes a buffer device for temporarily storing each generated, connection-related communications data record.

7. A system evaluator, comprising:
at least one interface for linking an evaluator to a digital switching exchange;
at least one interface for linking the evaluator to a test unit, including:
a device for recognizing interrelated communications data records which are assigned to a test communications connection, and
a device for comparing the contents of a connection-related reference data record produced by the test unit to the contents of each communications data record of interrelated communications data records produced by the digital switching exchange with regard to the test communications connections
wherein the test unit includes a first memory unit for storing connection-related communications elements, a device for producing the connection-related reference data record from corresponding connection-related communications elements, and a device for transmitting the connection-related communications elements to the digital switching exchange, and
wherein the digital switching exchange functions in response to the received connection-related communications elements to establish the test communications connection.

8. The system evaluator as recited in claim 7, further comprising:
a first device for converting format of the connection-related reference data record into a predefined record format; and
a second device for converting format of each communications data record into the predefined record format.

9. The system evaluator as recited in claim 7, wherein each communications data record includes a plurality of predefined data fields, which are assigned each a predefined range of values; and the evaluator is designed to verify each structure of the communications data record and to verify each data field to determine whether communications data contained in one data field are within a range of values in question.

10. The system evaluator as recited in claim 7, wherein the evaluator has a device for verifying at least one of: a) whether each communications data record generated in the digital switching exchange belongs to an established test communications connection; and b) whether at least one communications data record has been generated for an established test communications connection.

11. The system evaluator as recited in claim 7, wherein in comparing the contents of at least one predefined data field of the reference data record to the contents of at least one data field of each corresponding communications data record, the device for comparing of the system evaluator allows for a preset tolerance range.

12. A method for validating connection-related communications data collected by a digital switching exchange, comprising the following steps:
a) storing a plurality of communications elements in at least one test unit capable of being linked to a digital switching exchange;
b) initiating the establishment of at least one dedicated test-communications connection at the test unit;
c) transmitting the connection-related communications elements to the digital switching exchange;
d) establishing the relevant test communications connection in response to the received, connection-related communications elements;
e) generating a reference data record from the connection-related communications elements, from the beginning and ending instants of the corresponding communications connection in the test unit;
f) generating a plurality of interrelated and connection-related communications data records in the digital switching exchange;
g) following the connection cleardown, the reference data record and each communications data record of the corresponding test communications connection are transmitted to a system evaluator;
h) recognizing interrelated communications data records which are assigned to the test communications connection; and
i) comparing contents of the connection-related reference data record to contents of each of the interrelated communications data records.

13. The method as recited in claim 12, wherein, prior to the comparison step h, a format of the reference data record and a format of each communications data record are converted into a uniform format.

14. The method as recited in claim 12, wherein each communications data record includes a plurality of data fields; a predefined range of values is assigned to each data field; and, in the system evaluator, a structure of each communications data record and of each data field is checked to determine whether the communications elements contained in each data field are within the range of values in question.

15. The method as recited in claim 14, wherein a communications data record is indicated as being faulty when: its contents cannot be assigned to the contents of the corresponding reference data record; its structure does not correspond to a predetermined structure; and the communications data contained in a data field are not within a range of values assigned to the data field.

* * * * *